Patented June 27, 1933

1,915,969

UNITED STATES PATENT OFFICE

LAWRENCE E. BARRINGER, OF SCHENECTADY, NEW YORK, ASSIGNOR TO GENERAL ELECTRIC COMPANY, A CORPORATION OF NEW YORK

ELECTRICAL ARC RESISTANT MATERIAL

No Drawing.   Application filed November 19, 1930.   Serial No. 496,825.

This invention relates broadly to electrical arc-resistant materials having an insulating base and particularly to electrical arc-resistant insulation materials comprising resins of the phenol-formaldehyde type.

One of the outstanding disadvantages of various forms of insulation made with resins of the phenol-formaldehyde type as a binder is that the insulation quickly and easily carbonizes under arcing conditions. Parts molded from phenolic resins, or laminated plate material, tubes, rods and the like made with such resins as a binder, are very strong mechanically and of high dielectric strength but can not be used safely where there is any arcing across the surface because the resin will, under the action of the arc, decompose to produce a conducting residue, and the surface resistivity will be so reduced that break-down follows shortly thereafter. This so-called "tracking" is a well recognized objection and its remedy has long been sought in connection with insulation embodying phenolic resins.

I have discovered that I can obviate the arcing effect and at the same time preserve all the good features of phenolic resin insulation by applying one or more coatings of an alkyd resin to the surfaces which are exposed to arcing conditions. As is known, alkyd resins include all those complexes resulting primarily from the inter-reaction of a polyhydric alcohol, such as glycerine, and a polybasic acid, such as phthalic anhydride, with or without other reacting ingredients.

In carrying my invention into effect the molded or laminated parts containing the phenolic resin are coated in any suitable manner with an alkyd resin, as by dipping, spraying or brushing the exterior parts and then baking at a temperature, varying from about 100° to about 200° C. for a time varying from about 30 to about 90 minutes to thoroughly harden the alkyd resin film. Where an air-drying alkyd resin is employed the baking step may be omitted. In some cases, as where small molded parts are to be protected against arcing, the alkyd resin may advantageously be added to the mixture in the mold and compressed as a veneer on the surfaces. In the case of laminated plate material the alkyd resin may be applied as a veneer, preferably by dipping a sheet of material, such as asbestos paper, in an alkyd resin varnish and then applying the sheet over assembled sheets of fibrous material, for example, paper, treated with a phenolic resin.

The alkyd resin in the form of a varnish may be used with or without heat-resisting pigments and/or fillers which are not readily fused or broken down, as for example, zirconium oxide, alumina, silica, asbestos, powdered mica, etc.

As a result of my invention the dielectric strength of the phenolic resin materials is improved, and the film of alkyd resin on the surfaces thereof prevents "tracking". Molded parts made in accordance with my invention have been found to be very effective arc-resistant materials, particularly in connection with train control equipment.

While I have described my invention particularly in connection with phenol-formaldehyde resins it will be apparent that in principle it is not limited to such resins but is applicable also to other types of resins which are "tracking" in nature, for example, resins of the urea-formaldehyde type, or insulating bases comprising such resins as a binder, in order to render them "non-tracking".

What I claim as new and desire to secure by Letters Patent of the United States, is,—

1. An electrical non-tracking material comprising a base of phenolic resin and a coating of alkyd resin on the surfaces thereof.

2. An electrical non-tracking laminated sheet structure comprising fibrous sheets impregnated with phenol-formaldehyde resin, the entire structure being surfaced with an alkyd resin.

3. An electrical non-tracking molded part comprising a molded base of phenol-formaldehyde resin and a veneer of alkyd resin.

4. An electrical non-tracking material comprising an insulating base which normally tracks under action of an electrical arc and a film of non-tracking material thereon comprising an alkyd resin.

5. An electrical non-tracking material comprising a body portion of laminated fibrous sheets impregnated with phenolic resin, said laminated body portion being surfaced with asbestos sheets containing an alkyd resin.

In witness whereof, I have hereunto set my hand this 18th day of November, 1930.

LAWRENCE E. BARRINGER.